United States Patent [19]

Lecohier

[11] Patent Number: 4,580,008

[45] Date of Patent: Apr. 1, 1986

[54] REMOTE CONTROL DEVICE THROUGH THE TELEPHONE NETWORK

[75] Inventor: Roland Lecohier, Rance, Belgium

[73] Assignee: Association Intercommunale d'Electricite du Sud du Hainaut, Rance, Belgium

[21] Appl. No.: 532,026

[22] PCT Filed: Dec. 28, 1982

[86] PCT No.: PCT/BE82/00026

§ 371 Date: Aug. 29, 1983

§ 102(e) Date: Aug. 29, 1983

[87] PCT Pub. No.: WO83/02375

PCT Pub. Date: Jul. 7, 1983

[30] Foreign Application Priority Data

Dec. 29, 1981 [BE] Belgium ............................ 0/206950

[51] Int. Cl.$^4$ .......................................... H04M 11/00
[52] U.S. Cl. ..................................... 179/2 A; 179/5 R
[58] Field of Search ............... 179/2 A, 2 AM, 2 DP, 179/5 R, 5 P, 84 VF

[56] References Cited

U.S. PATENT DOCUMENTS

| 4,095,050 | 6/1978 | Beachem et al. | 179/2 A |
| 4,121,053 | 10/1978 | Dick | 179/2 A |
| 4,174,064 | 11/1979 | Pratt, Jr. | 179/2 A X |
| 4,206,444 | 6/1980 | Ferlan | 340/147 R |
| 4,266,097 | 5/1981 | Cannon et al. | 179/2 A |

FOREIGN PATENT DOCUMENTS

| 891645 | 4/1982 | Belgium . |
| 2824169 | 12/1978 | Fed. Rep. of Germany . |
| 2074678 | 10/1971 | France . |
| 2138217 | 1/1973 | France . |

Primary Examiner—W. J. Brady
Attorney, Agent, or Firm—Oblon, Fisher, Spivak, McClelland & Maier

[57] ABSTRACT

This invention describes a remote controlled device which uses the telephone network as a transmission medium and makes it possible to transmit signals in both directions between two stations. This remote control device comprises a master station giving the instructions, which is connected to a first telephone station, and a subordinate station, connected to a second telephone station, receiving and executing the instructions and signaling the execution of the instructions. The communication between these two stations uses alternately only a single telegraph channel for outgoing and incoming transmissions, and the telephone connecting the two stations is a conventional telephone line serving for conversation between two persons.

13 Claims, 9 Drawing Figures

REMOTE CONTROL DEVICE THROUGH THE TELEPHONE NETWORK

BACKGROUND OF THE INVENTION

1. Field of the Invention

The present invention relates to a simple remote control device which uses the public telephone network as a transmission medium.

2. Description of the Prior Art

In addition to radio remote control devices, several remote control installations using telephone lines are known, in particular those described in the following documents: US-A-4 206 444, GB-B-1 235 481, FR-A-2 074 678 and FR-A-2 138 217.

U.S. Pat. No. A-4,206,444 relates more particularly to a computer power-supply control which even requires a special telephone line. For this reason, this device is intended for a different purpose from that covered by the present invention.

The object of the device described in British Patent B-1 235 481 also differs from that of the present invention. Moreover, its design and its mode of operation are liable to produce many interfering harmonic vibrations which risk giving rise to incorrect commands.

The documents FR-A-2 074 678 and FR-A-2 138 217 have disclosed remote control devices which use the telephone network as a transmission medium and which make it possible to transmit signals in both directions between two stations. However, these devices, the first of which incorporates a manual reversing key, have a design tending to produce harmonic vibrations which risk giving rise to incorrect commands. Moreover, the system for coding the instructions is such that the least distortion of the message results in an incorrect interpretation of the instruction. This type of device is therefore unsuitable for uses where high operating reliability is required.

Centralized remote control devices are also known which use the high-voltage and low-voltage network as a transmission medium. Because of their operating principle and their basis of construction, these devices do not allow signals to be transmitted in the opposite direction.

It is therefore established that there is a need for providing remote control devices which work with good operating reliability to allow uses, such as, for example, the remote control of valves or circuit-breakers, whilst using a public telephone line. The aim is, therefore, to avoid the need to use one or more private or special telephone lines intended for the transfer of complex and numerous data, such as, for example, an interconnection between computers.

SUMMARY OF THE INVENTION

The object of the present invention is consequently to provide a simple remote control device which uses the ordinary telephone network as a transmission medium and which makes it possible to transmit signals in both directions between two locations equipped with conventional telephone stations.

The object of the present invention is achieved by means of a remote control device which uses the telephone network as a transmission medium and which makes it possible to transmit signals in both directions between two stations, and which consists of a master station giving instructions and connected to a first telephone station and of a subordinate station which receives and executes the instructions and signals the execution of the instructions and which is connected to a second telephone station, the communication between these two stations making use alternately of only a single telegraph channel for outgoing transmission and for incoming transmission, and wherein the telephone line connecting the two stations is an ordinary telephone line serving for conversation between two persons.

The device according to the invention has the advantage that it is simple and therefore inexpensive. It can also be installed by being connected to any telephone station and can be used both on an industrial scale and in the private sector, that is to say in the home, to control operations such as, for example, the heating of a second residence.

According to an advantageous embodiment of the present invention, the master station comprises a suitable number of control switches connected to a multiplexer and an address coder, a frequency generator producing two frequency levels, namely the level 1 and the level 0 for the control signal which is transmitted to the telephone line with suitable amplification for control purposes, a device for detecting the return signal, a device for decoding this signal, and a display of the return signal.

In a similar way, the subordinate station comprises a telephone answerer which detects the ringing of the telephone station and which signals to the master station that a connection has been made, detection and decoding of the control signal sent via the master station and amplification of the said signal sent to the output interface, an interface establishing that the instruction has been executed, a multiplexer and coder of the return signal, and a frequency generator producing the two logic levels for the return signal which is transmitted to the telephone line with suitable amplification.

The present invention will be described in more detail with reference to the attached Figures in which identical reference symbols represent identical or similar elements.

It goes without saying that the following description is given by way of example and that it in no way limits the scope of the present invention.

DETAILED DESCRIPTION OF THE PREFERRED EMBODIMENTS

Figure 1:
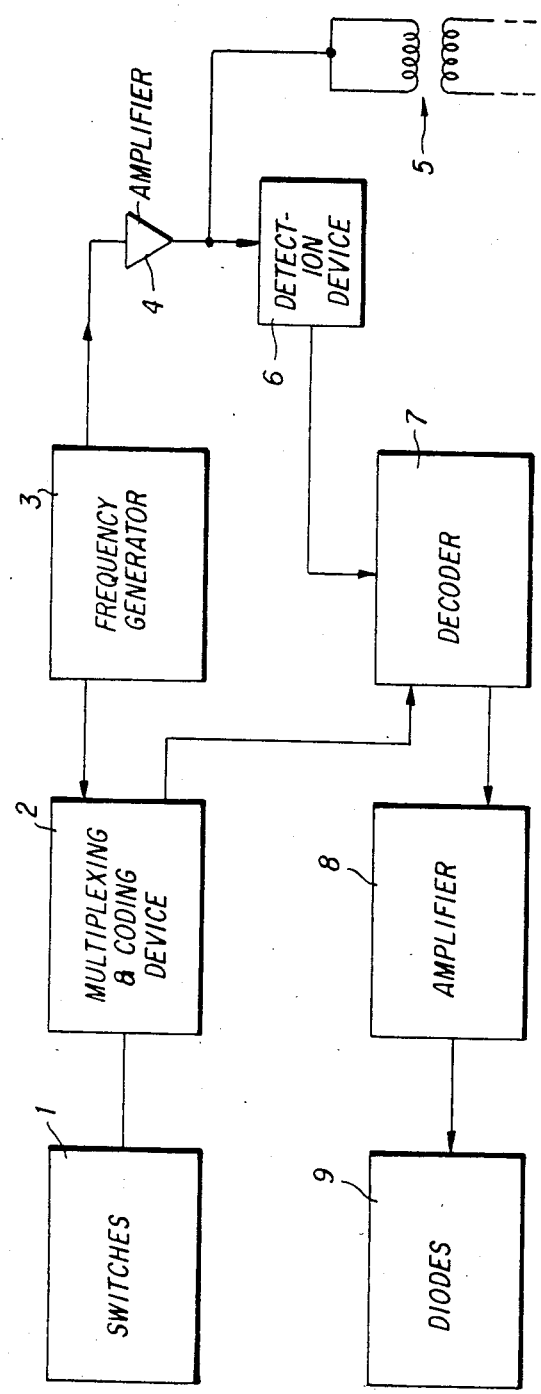
FIG. 1 shows a block diagram of the master station.
Figure 2:
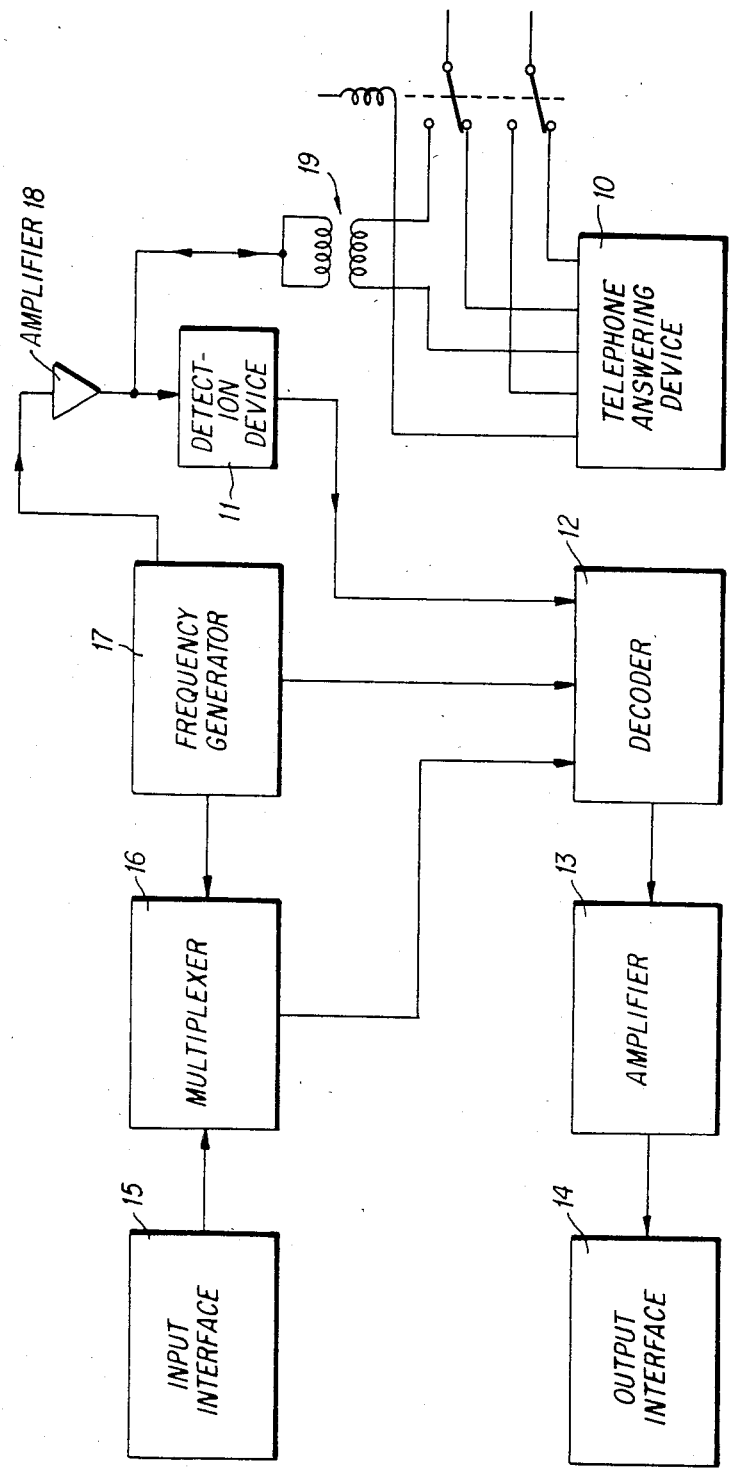
FIG. 2 shows a block diagram of the subordinate station.

To make it easier to understand how the device according to the invention operates, the block diagrams of the master station and the subordinate station are explained to start with, referring respectively to FIGS. 1 and 2.

According to a particular embodiment, the master station giving the instructions incorporates eight switches 1, preferably eight pushbuttons making it possible to give eight different instructions. These eight signals enter a multiplexing and coding device 2. A frequency generator 3, explained in more detail below, makes it possible to produce two frequencies forming the two logic levels 0 and 1. When the amplifier 4 is made to transmit, the control signal can be amplified and sent along the telephone line isolated electrically from the device according to the invention by a transformer 5.

When the subordinate station "notes" that the instruction corresponding to the control signal has been executed, it sends a corresponding return signal. This is detected in the master station by the detection device 6. This return signal must also be decoded at 7 before being amplified at 8 in order to be displayed, for example by means of the diodes 9.

In a similar way, the subordinate station shown diagrammatically in FIG. 2 incorporates a telephone answerer 10 making it possible to detect the ringing of the telephone station when the telephone receiver is not lifted and sending a message back to the master station signalling that communication has been made. The control signal coming from the master station is subsequently detected at 11 before undergoing demultiplexing and decoding at 12. The decoded control signal is amplified in an amplifier 13 which is connected to the output interface 14 incorporating the control means, for example relays.

When the instruction has been executed, the input interface 15 sends a coded return signal corresponding to the said command and having undergone multiplexing at 16 along the telephone line in a similar way to the operation of the master station (the frequency generator 17 producing the two logic levels, the amplifer 18 and the electrical isolation 19). This return signal will be displayed at the master station in the way described above.

According to an especially advantageous embodiment of the present invention, all the frequencies used are produced by dividing a stabilised pilot frequency.

Preferably, this pilot frequency is equal to 1 MHz and is divided at 19 in the circuit 20 to obtain 52,631 Hz, the latter being divided first three times by 16 in the circuit 22 to obtain the clock frequency of 12.8 Hz, secondly by 28 to obtain the logic level 1 of 1880 Hz and thirdly by 29 to obtain the logic level 0 of 1815 Hz.

Furthermore, at the master station only, the frequency of 12.8 Hz is divided twice by five in the circuit 24 to obtain the time base of the complete cycle of 0.5 Hz (two seconds). After these two seconds, the circuit 26 supplies a pulse of 0.15 seconds which serves to synchronize the time bases at the master station and at the subordinate station. In fact, by applying a positive signal to the terminal 28, all the circuits 22 producing the clock frequency of 12.8 Hz are reset to 0.

The frequency of 52,631 Hz is divided by 28 or 29 by means of two circuits 30 and 32, the 0-resetting inputs of which are controlled in such a way that, if S is at the high level and M is at the high level, the outputs standing at 20 and 8 cause 0-resetting, and there is therefore division by 28 and 1880 Hz is obtained at the terminal 36; if S is at the high level and M is at the low level, the outputs standing at 20, 8 and 1 are required at the same time to cause 0-resetting, and division by 29 is obtained, hence 1815 Hz at the terminal 36.

Consequently, depending on the voltage applied to the points M (modulation) and S (silence), the following can be obtained at the terminal 36:

no signal (if S=0, zero-resetting is activated),
1815 Hz corresponding to the level 0,
1880 Hz corresponding to the level 1.

The signals supplied to the terminal 36 are rectangular and they will subsequently be filtered to eliminate the harmonics from them.

However, it is noteworthy that at the moment of change in the state of the point M the divider continues to count exactly as though nothing had happened, and 0-resetting occurs only after 28 or 29 pulses at the input; the result of this is a smooth passage from the frequency of 1815 to the frequency of 1880, and vice versa, thus preventing additional harmonics in the signal sent along the telephone line at the moment of frequency changes.

At the master station only, the synchronizing signals will generate at the point M a positive pulse of 0.15 seconds, and this will bring to the output terminal 36 a pulse of 0.15 seconds at the frequency of 1880 Hz.

This pulse will pass through all the filtering and amplification circuits and return to the terminals of the telephone line at the master station; this pulse will reach the subordinate station with a certain delay attributed to the length of the line.

This pulse will be detected at the master station and at the subordinate station and it can be used for the zero-resetting of the clocks of both the master station and the subordinate station.

The circuit 40 transmits the signal from the point S to the signal amplification circuit before sending it along the telephone line, in order to reset the amplifier gain to zero when S is positive (silence).

The circuit 42 serves to synchronize the command (instruction) and address signals leaving the multiplexer, in order to send them along the telephone line in the form of pulses at audio frequencies. As regards the subordinate station, the logic circuit 44 incorporates three inputs connected to one another and to the signal indicating the series two explained below. This signal makes it possible to indicate to the master station that the instruction has been executed.

Figure 4:
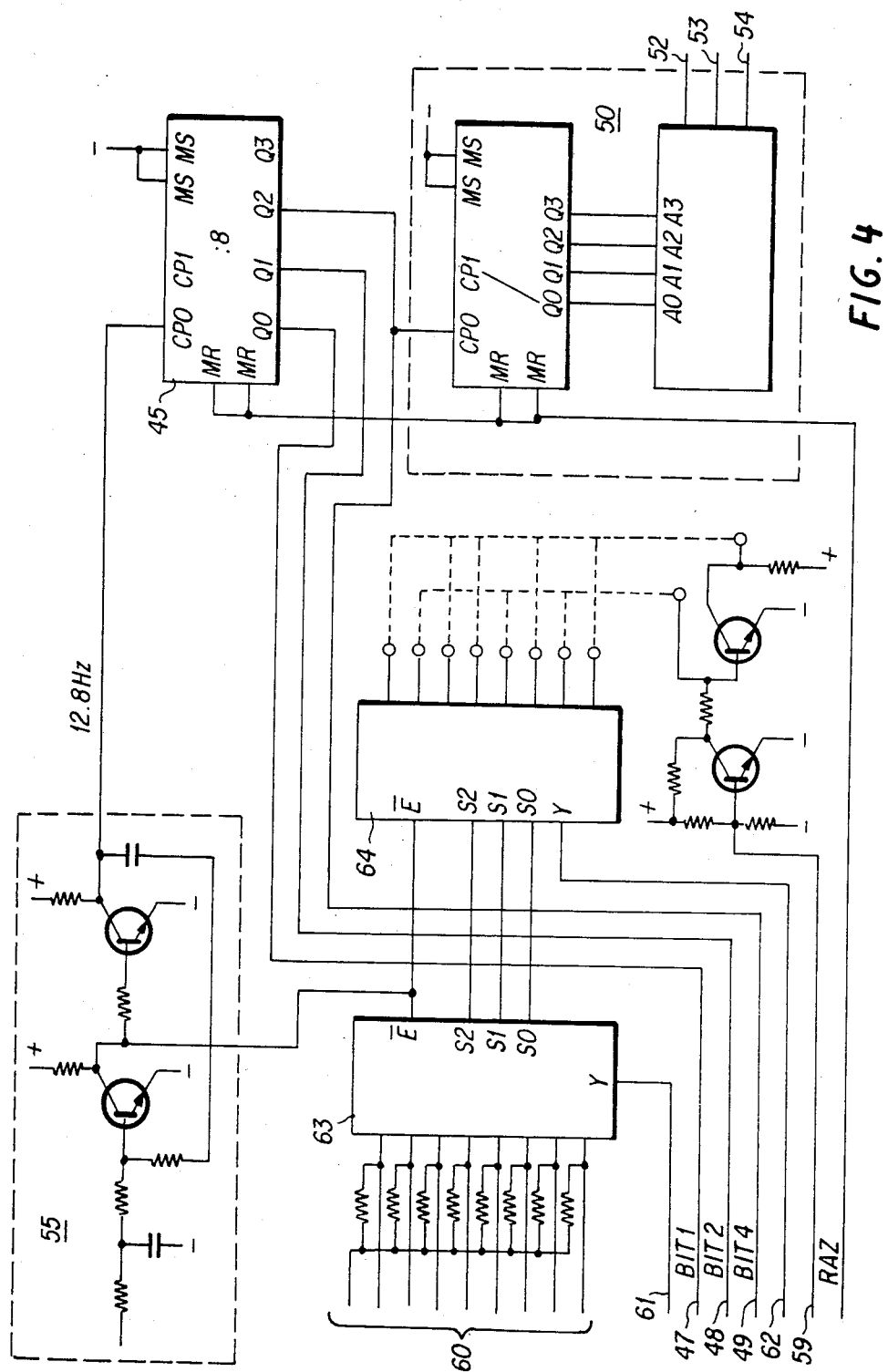
FIG. 4 shows a multiplexing circuit.

FIG. 4 shows an example of multiplexing and address coding.

After undergoing a delay of 0.1 msec in the circuit 55, the clock pulse of 12.8 Hz is first divided by 8 in the circuit 45 to give three series of 8 pulses, which can be numbered from 0 to 7, by means of the signals designated bit 1, bit 2 and bit 4 which are obtained at QO, Q1 and Q2 and which appear at the output terminals 47, 48 and 49.

The circuit 50 then offers the possibility of numbering the series of 8 pulses, namely series 0, 1 and 2, which are obtained in negative logic at the output terminals 52, 53 and 54.

The series 0, 1 and 2 mean that one series—series 0—is reserved for the command (instruction) signal, that another series—series 1—is reserved for address coding and that a third series—series 2—is reserved for the return signal which comprises only the address of the command to signal to the operator of the master station that the instruction has been executed.

Because the series 0 and 1 are not needed for the return signal, the inputs of the logic circuit 44 are short-circuited in the case of the subordinate station.

Figure 5:
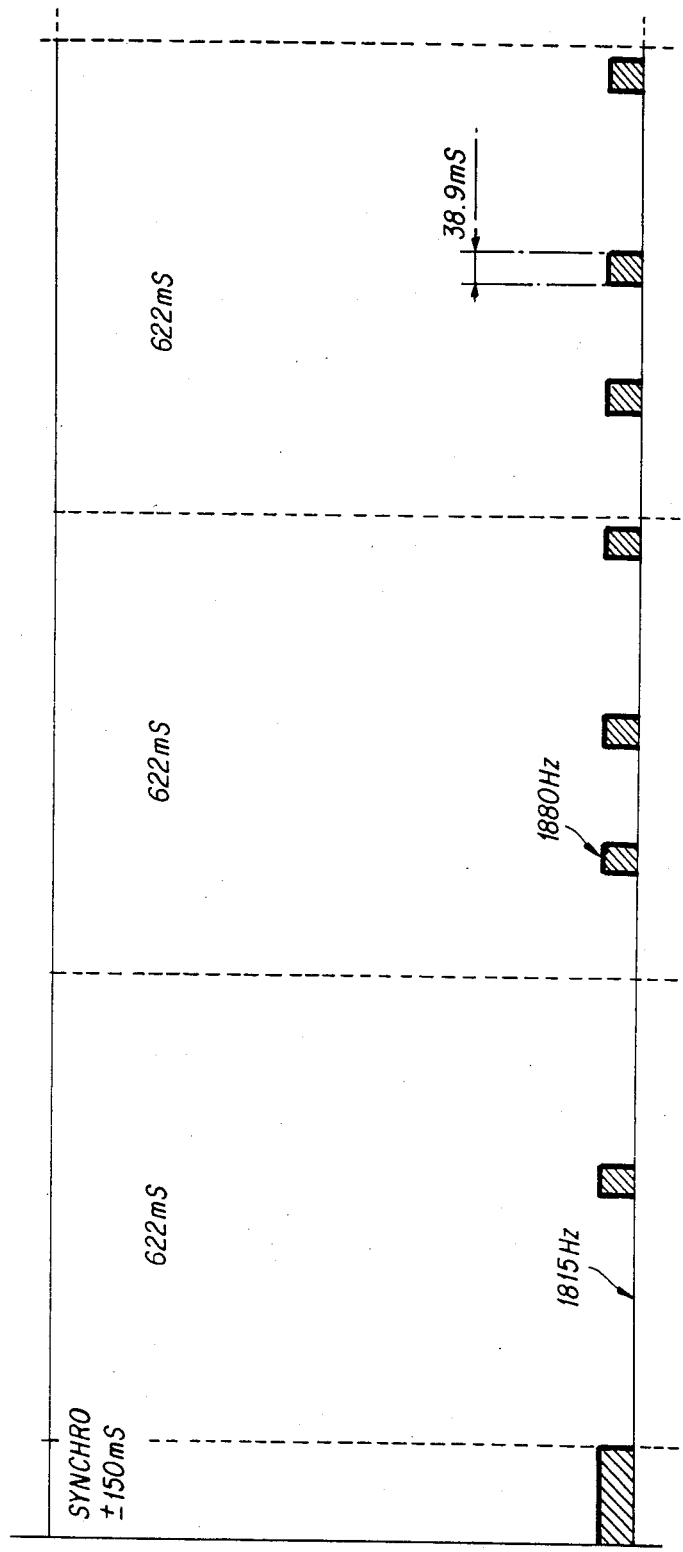
FIG. 5 shows the shape of the various signals.

The message is therefore composed as follows (FIG. 5):

The cycle starts with a synchronizing signal transmitted by the master station for 0.15 seconds, and then the master station transmits for 622 msec the series 0 comprising 8 bits, only one of which can be at the level 1. Any message with a series zero comprising more than one + bit would be refused.

Subsequently, again for 0.622 seconds, the master station transmits the series 1 comprising 8 bits forming a coded "address": this address must comprise three + bits and five − bits in a specific order which must be recognised by the subordinate station. If there is no instruction to be transmitted, the series 1 address is inverted (− bits instead of + bits and vice versa).

So that an instruction can be executed, the subordinate station must receive:
- one + bit in series 0 instructions (which it will execute),
- three + bits corresponding to the selected code in the series 1 address,
- a total of four + bits.

Any message not complying with these three points is refused.

For the following 622 milliseconds, the subordinate station will send a message of eight bits, each of which has a meaning and corresponds to the eight signals to be transmitted.

The 77 milliseconds which follow whilst awaiting a new synchronizing signal are not used; in fact, they serve for waiting out the time lost by the signals along the telephone lines.

This procedure has several advantages:
great simplicity of the signals,
use of a single telegraph channel. By adding a band filter, this could even make it possible to use the line simultaneously for a telephone conversation and remote control.

Figure 3:
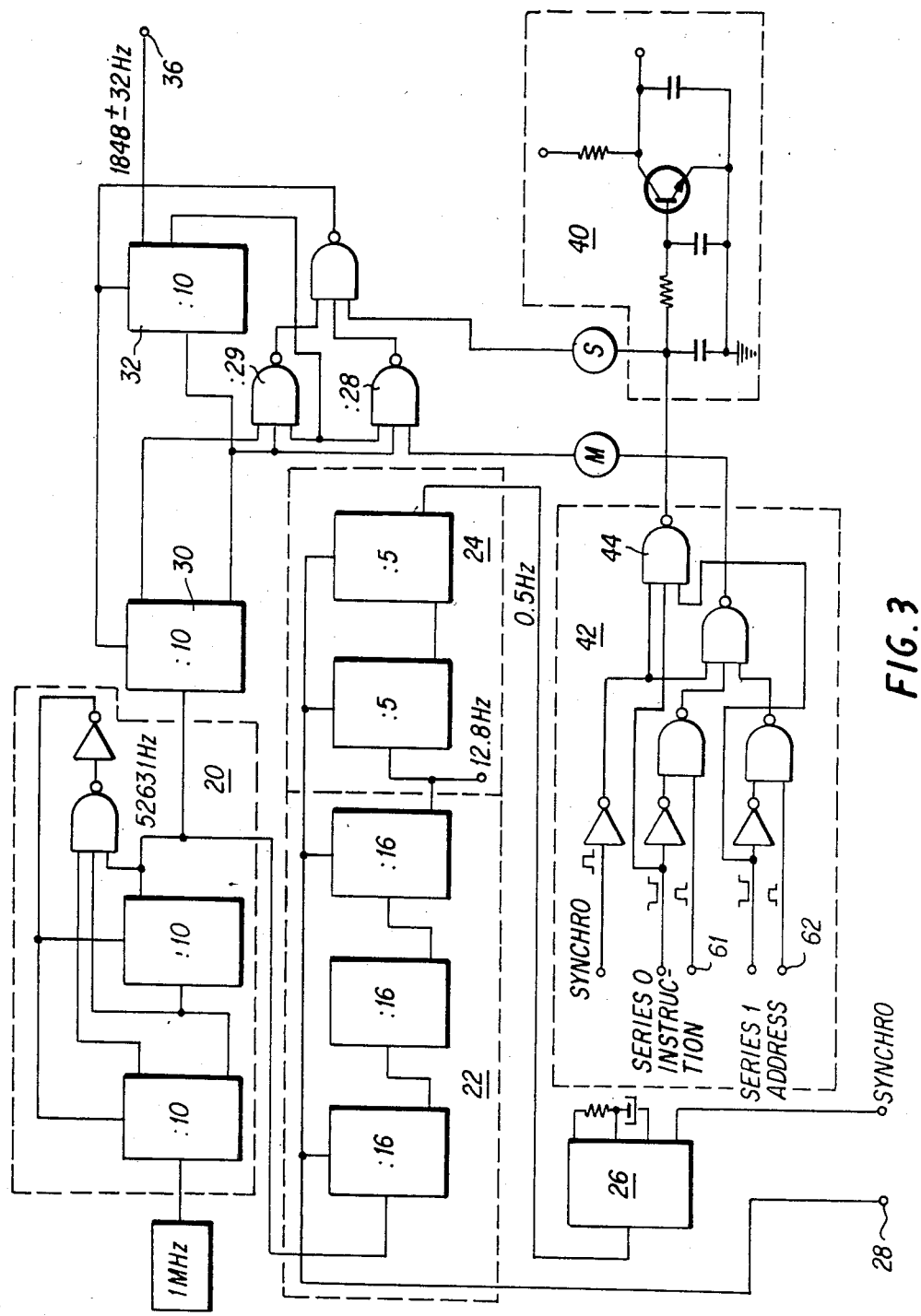
FIG. 3 shows a frequency generator according to the present invention.

The circuits for coding the signal given, for example, by means of a pushbutton actuated by the operator at the master station is of a conventional type. The reference symbol 60 indicates the eight inputs coming from an input interface like that shown diagrammatically in FIG. 1 by reference symbol 1. Pressure on a pushbutton causes the polarity of the input terminal 59 to change, the effect of which is to reverse the polarities of the eight inputs of the circuit 64. The connections indicated by broken lines are made either by means of a socket and a plug, the wiring of which can be personalized for each use, each having a different "address" message, or by means of eight reversible mini-switches. The signals 61, 62 which have come respectively from the instruction coding circuits 63 and from the address coding circuit 64 are transmitted to the circuit 42 (FIG. 3). Since the synchronizing pulses likewise arrive at the circuit 42, this results at the point M, in the way described above, in a message which is sent along the telephone line if S is positive.

As regards the subordinate station, the circuit shown in FIG. 4 incorporates only a single circuit 63 making it possible to code the state of switches, for example contacts of relays supplied by the eight controlled devices, in order to signal to the operator of the master station that the instruction has been executed at the said address.

Figure 6:
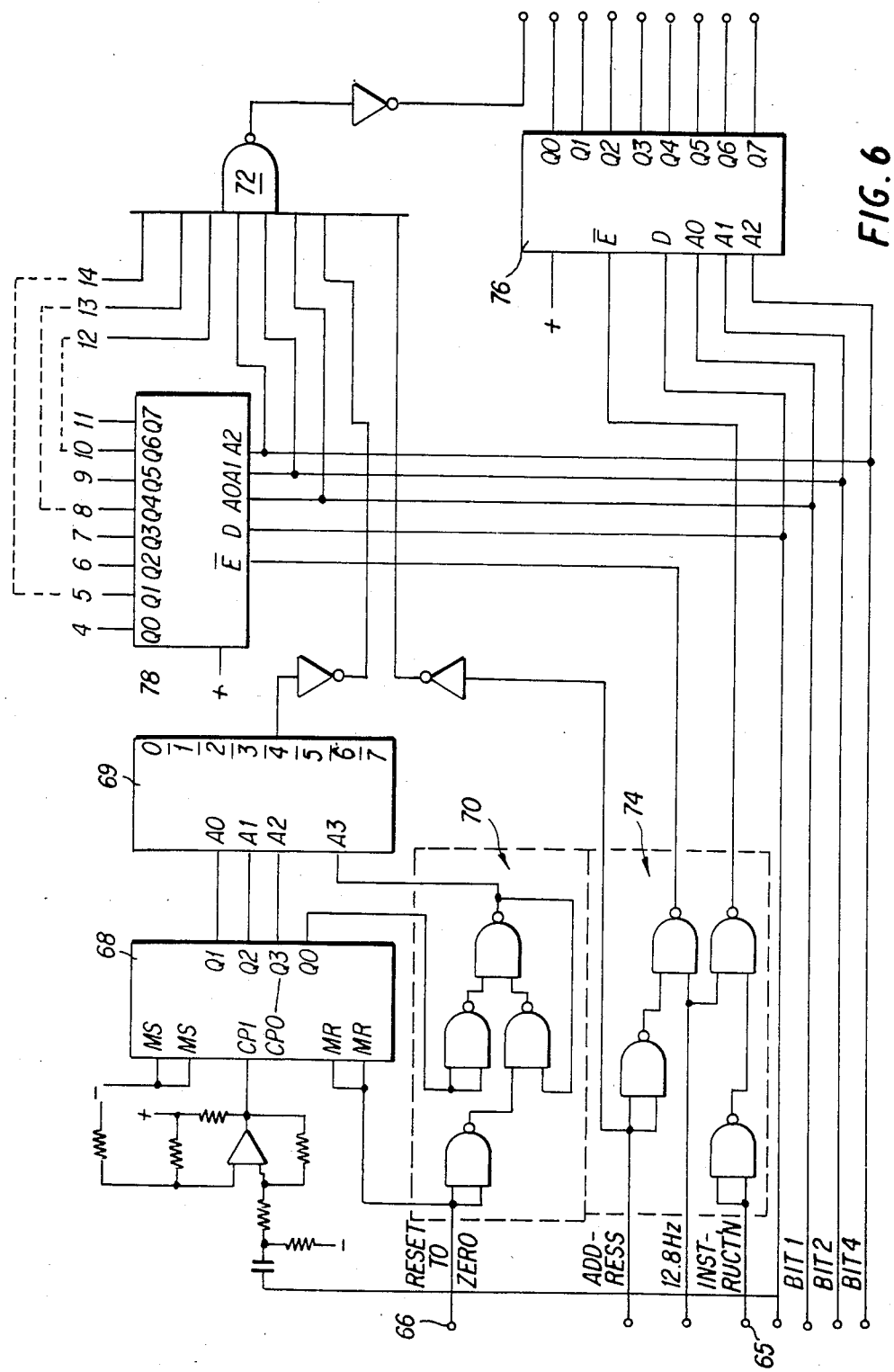
FIG. 6 shows a preferred embodiment of a decoding and demultiplexing circuit intended for the subordinate station.

Referring to FIG. 6. which shows a possible embodiment of a decoding and demultiplexing circuit intended for the subordinate station, the pulses detected are applied to the input terminal 65, whilst the synchronizing pulses are applied to the input terminal 66 where they serve to reset to zero the counter consisting of the circuits 68 and 69, to which has been added a tank circuit 70 inserted in the transmission of the eighth bit between the output of the integrated circuit 68 and the input of the integrated circuit 69, in such a way that it is possible to obtain a signal at the output of the integrated circuit 69 only if four detected pulses have actually been counted since the last zero-resetting. This signal will be applied to one of the eight inputs of the integrated logic circuit 72.

The 12.8 Hz clock pulse and the series 0 (instruction) and series 1 (address) signals are applied to the demultiplexing circuit, and a circuit 74 then sends to the two demultiplexing circuits 76, 78 the unblocking signals which will enable them to transfer to their corresponding output terminals the stored states of the pulses decoded during the period of the eight bits of their respective series. To be sure of reblocking them before the change in numbering of the bits (the change in state of the bit 1, bit 2 and bit 4 signals), this change of state has been delayed somewhat, and this is the reason for the delay time mentioned above (circuit 55)—clock circuits, delay time of 0.1 milliseconds—which was brought about before dividing the 12,8 Hz clock frequency by 8.

A single positive signal, which will be transmitted to the instruction confirmation circuits, is obtained, if appropriate, at the eight outputs of the demultiplexing circuit 76 corresponding to the instruction series.

The coded address is obtained, if appropriate, at the eight outputs of the other demultiplexing circuit 78 corresponding to the address series. The three positive signals corresponding to the address required are transmitted to three inputs of the circuit 72 via the connections shown by broken lines, which, as in demultiplexing, are made by means of a plug and socket with coded wiring or by means of mini-switches.

The circuit 72 therefore receives at its eight inputs: the address coding; bit 1, bit 2 and bit 4; the address series; the confirmation that there have been exactly four positive pulses.

In this case only and at this precise moment, that is to say just at the end of the message transmitted by the master station, the circuit 72 transmits to the output terminal a pulse of 3 msec, confirming that the instruction decoded by the circuit 76 can be executed.

Figure 7:
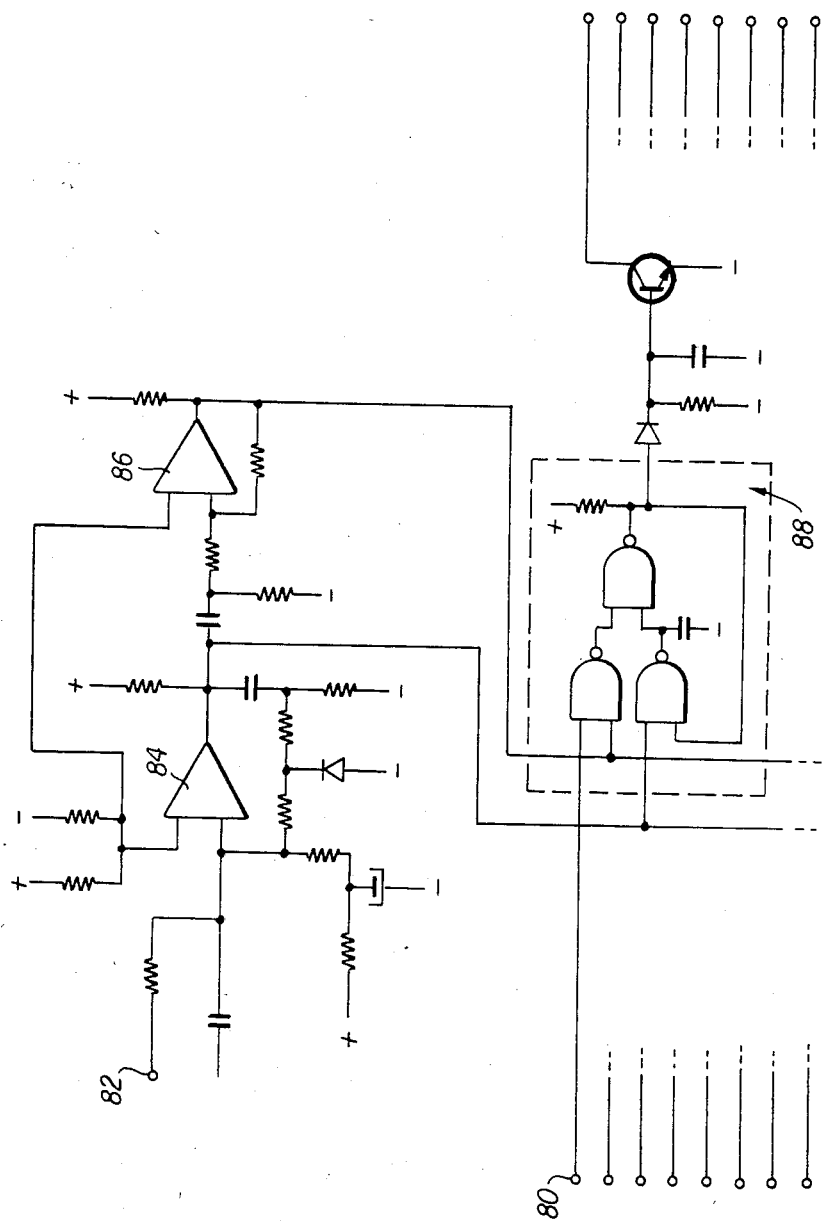
FIG. 7 shows an embodiment of an amplifying circuit for controlling the relays.

When an instruction to be executed and its confirmation respectively appear simultaneously, for example at the inputs 80 and 82 of FIG. 7 showing the amplification and control of the relays, the circuit 84 stores a pulse of 0.5 seconds, whilst at the same time the circuit 86 sends a pulse of 0.1 msec which makes it possible to store in a logic circuit 88 a signal which will lock the output relay, and this signal will remain stored for the entire duration of the pulse of 0.5 seconds generated by the circuit 84. The upper part of FIG. 7 is common to the eight commands, whilst the circuit 88 and the following circuits are reproduced eight times.

By means of this process, an instruction, only one at any given time, is executed only if it has received confirmation of execution; moreover, if the output relay controls, for example, an industrial interference generating unit which is so large that it is capable of disturbing certain circuits, this interference could not occur before the end of the above-mentioned pulse of 0.1 msec, and consequently an interfering instruction could not be executed.

At the master station, the configuration of the circuit of FIG. 6 is much simpler. In fact, this circuit comprises only a single integrated circuit 76 which decodes only the eight signals of the signalling series transmitted by the subordinate station. Each of these eight signals feeds an LED diode or a pilot light serving to display the transmitted signal state.

Figure 8:
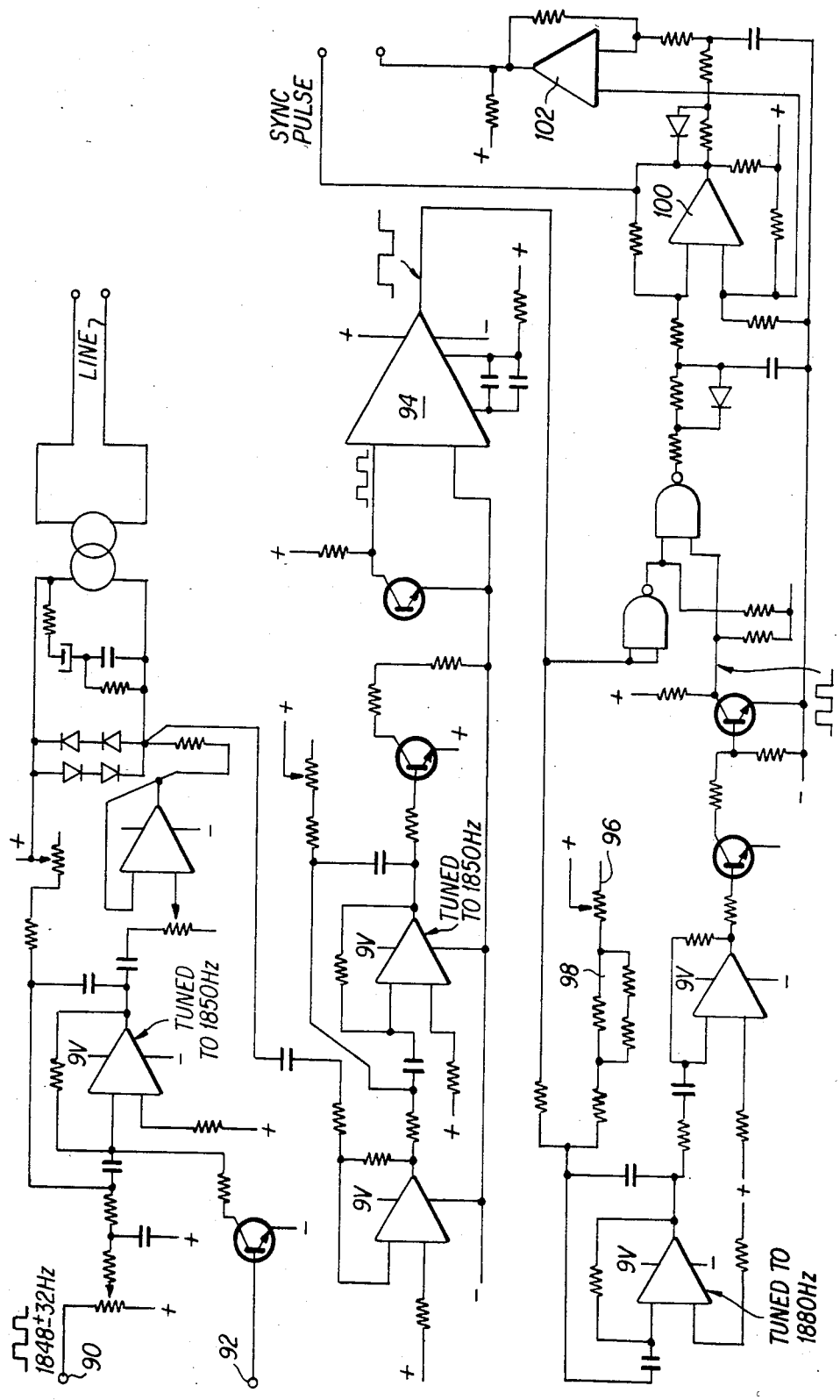
FIG. 8 shows an embodiment of the amplification and detection circuit.

Referring now to FIG. 8, it can be seen that the rectangular signals transmitted by the frequency generator enter at the terminal 90. They pass via an amplifier tuned to the central frequency of 1848 Hz. The gain of this amplifier can be reset to zero by applying to the input 92 a positive voltage coming from the point S (silence), as described above.

The detection circuit starts with a saturable amplifier followed by an amplifier tuned to the central frequency of 1848 Hz and subsequently two transistors connected as saturated amplifiers, so that square-wave signals are obtained at the input of the circuit 94, whatever the level of the signal along the telephone line (between +10 and −45 dB).

The circuit 94 then produces rectangular signals calibrated in such a way that the plus part amounts to ±60% and the minus part amounts to 40% of a period.

These signals are sent, on the one hand, into a comparator and, on the other hand, to the input of an amplifier tuned to the "YES" frequency of 1880 Hz.

Next to the frequency-adjusting potentiometer 96 there are two thermistors 98 which stabilize the tuning frequency between −15° and +70° C.

At the tuning frequency, the input and output signals are 180° out of phase, and after passage through three saturated amplifiers a square-wave signal is obtained at the second input of the comparator, and this signal is in phase with the rectangular signal coming from the circuit 94 at the 1880 Hz "YES" frequency only, whilst for any other frequency the two signals are out of phase, and this phase difference causes negative pulses at the output of the phase comparator; if, on the other hand, the two signals are in phase (these are, in fact, a square-wave signal and a rectangular signal), there is no negative pulse at the output of the comparator. These possible negative pulses determine the state of the output of a flip-flop 100 which thus provides detection of the + frequency at 1880 Hz and the—frequency at 1815 Hz.

Subsequently the flip-flop 102 serves for filtering the pulses according to their duration, and only those of 150 msec (synchronizing pulses) appear at the output.

The remarkable characteristic of this detection by comparing square-wave and rectangular signals is that by adjusting the width of the rectangular pulses it is also possible to adjust the band width of the frequencies detected.

There is no coil in any of this assembly of detection facilities, and setting is carried out by adjusting two potentiometers.

Figure 9:
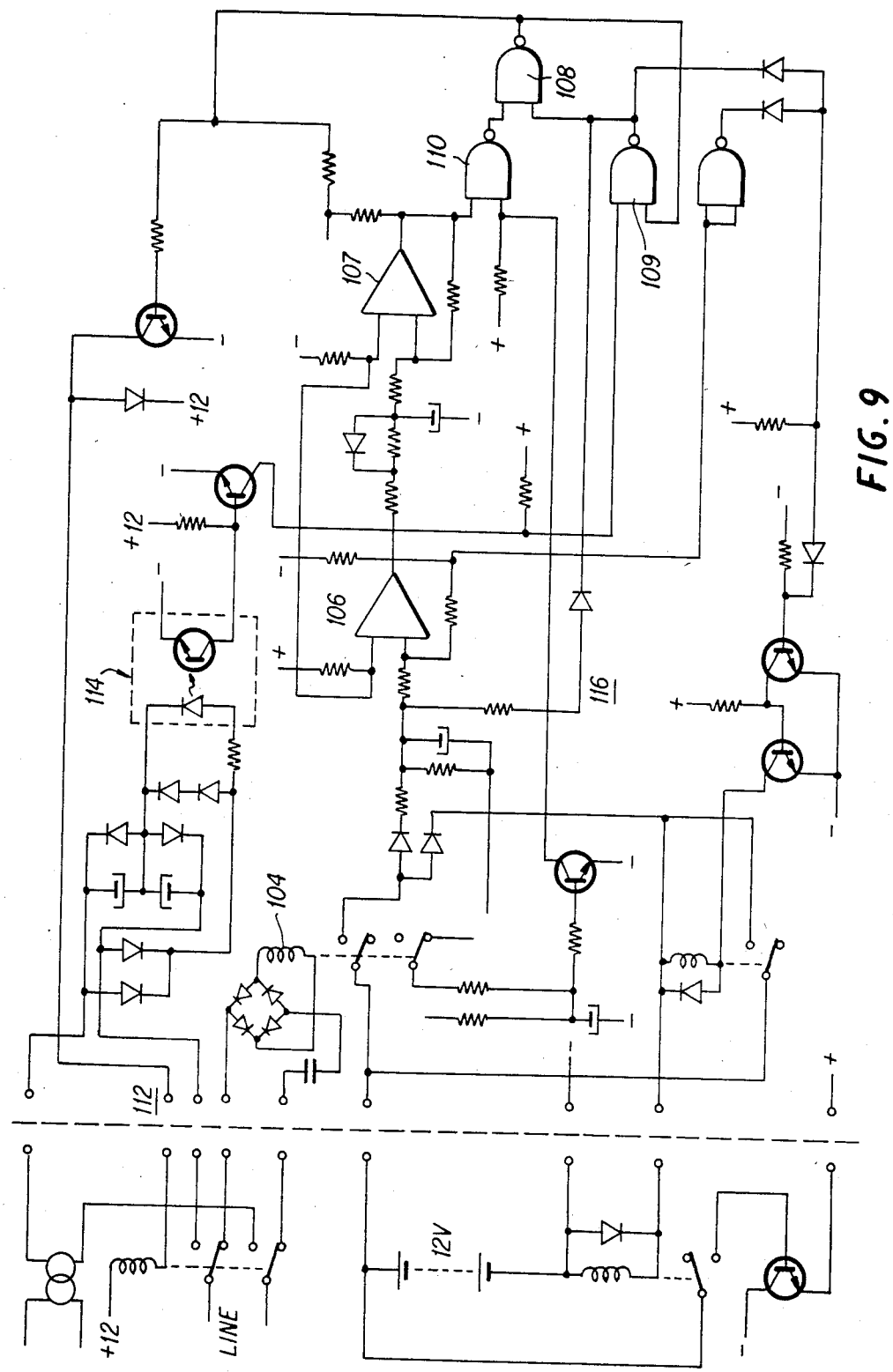
FIG. 9 shows the telephone answerer of the subordinate station.

The telephone answerer device arranged in the subordinate station is illustrated in FIG. 9.

A characteristic of the subordinate station is that it does not consume any power in the standby mode. In fact, it is only when the telephone ringing current is detected in a relay 104 that the 12 V supply relay is locked, and at the same time a delayed relay 106 which maintains the 12 V supply for 4 seconds, that is to say sufficient time to await the following ring.

If the rings succeed one another without interruption for at least 20 seconds, the output of the circuit 107 will become positive, and at the following ring (since it is necessary to be sure, here, that the caller has not replaced the receiver) the output 108 of the AND gate 110 will send via the terminal 112 the instruction to engage the telephone line so as to connect up the remote control device.

The direct current of the telephone line is detected immediately in the opto-coupler 114 which, for example via the logic gates 108 and 109, will command the self-holding of the connection to the telephone line.

When the caller replaces the receiver, the effect of the following brief cut in the direct current of the telephone line is to terminate the self-holding by means of the opto-coupler and logic circuit, the result of which is that the 12 V supply is cut off.

If the caller were by chance to replace the receiver just after the moment when the telephone line had been connected to the remote control device, the connection 116 would prevent the self-holding of the 12 V supply, thereby eliminating the risk of inopportune holding of the connection between the remote control device and the telephone line.

The effect of cutting of the switch at the master station is to free the telephone line and also disconnect the subordinate station. On the other hand, since the subordinate set is under self-hold via the direct current of the telephone line, it is still possible for a person present during a signal transmission to lift the receiver and cut off the supply to the remote control device and to communicate directly with the master station where, since all the signal lights would be extinguished because of a lack of return signals, the operator would be warned of the change in destination of the telephone connection.

The device typically functions as follows:

The operator of the master station lifts his telephone receiver and calls the subordinate station.

At the subordinate station, the telephone set rings normally six times, thus allowing the possible occupant to lift the receiver and answer.

After six rings, the subordinate station is connected to the line and sends an identification signal. If after 10 seconds the subordinate station has not recognized the signal from the master station, it can be disconnected (this refers to a call coming from a third party).

At the master station, as soon as the signal transmitted by the subordinate station is received, the pilot lights in question light up, and the operator can then send his commands by pushing the buttons and checking from the lights whether the instructions have been transmitted correctly.

If the operator cuts off the supply, the master station is cut off and the subordinate station is cut off, in turn, because it no longer receives any signals.

It is also possible to provide an alarm system which would consist of an automatic call by the subordinate station to the master station to signal a change of state. (This is used in standby systems to monitor the security of an installation).

It is also possible to provide identification by means of a simple coding of a few signals, and this coding could be programmed, for example, by means of a set of miniature switches which would be set open or closed once and for all at the time of installation in an identical way at the master station and at the subordinate station, so that a mass-produced set would be personalized for the user.

Advantageously, the device can also incorporate a certain redundancy in the signals transmitted, this being a limited redundancy, for example instead of transmitting simply a digit from 0 to 7 for the eight instructions, a set of three digits would be transmitted, the eight sets of three digits being selected so as to make confusion very unlikely.

The description of a preferred embodiment given above is, of course, made purely by way of example and in no way limits the scope of the present invention.

It is, of course, possible to provide numerous modifications of the circuits without going beyond the framework of the invention.

Thus, the input interface 15 can be of various types; it can, for example, advantageously function by opto-coupling.

Naturally, it is necessary to provide a series of auxiliary circuits, such as, for example, stabilized supplies, battery chargers, etc. These circuits are conventional and have not been commented on in this specification.

According to the invention, it is likewise possible to provide an embodiment incorporating, for example, sixteen commands and twentyfour return signals. This device functions on the same principle; it is sufficient to provide the connections for the additional bits.

The device according to the invention can be used for various purposes for the remote control, from the home, of circuit-breakers, or also, for example, the heating in a second residence. It also has an industrial use, involving controlling, from a central station, the components of a sub-station, for example pumping or even electricity stations.

What is claimed as new and desired to be secured by Letters Patent of the United States is:

1. A remote control device using the telephone network as a transmisstion medium and making it possible to transmit signals in both directions between two stations, which comprises:
   (a) A master station giving instructions, wherein the master station incorporates a suitable number of control switches connected to a multiplexer and an address coder (2), connected to a frequency generator (3) generating two frequency levels, namely the Level 1 and the Level 0 for control signal, which is transmitted to a telephone line with suitable amplification for the purpose of control, a device (6) connected to said phone line for detecting a return signal, and a device (7) connected to said detection device for decoding this signal, as well as a display means (9) of the return signal, said master sation is connected to a first telephone station, and
   (b) a subordinate station receiving and executing said instructions and signaling the execution of the instructions, wherein said station subordinate incorporates a telephone answerer (10) in connection with said telephone station detecting the ringing of the telephone station and signaling to the master station that connection has been made, means in connection with said master station for detection and decoding (12) of the control signal sent via the master station, and amplification means (13) connected to said decoding means of the said control signal sent to the output interface (14) which is connected to said amplification means, an input interface (15) establishing that the instruction has been executed, a multiplexer and a coder (16) of said return signal connected to said interface (15), and a frequency generator (17) in turn connected to said coder (16) generating the two logic levels for the return signal which is transmitted to said telephone line with suitable amplification provided by amplification means (18), said subordinate station is connected to a second telephone station, communication between these two stations using alternately only a single telegraph channel for outgoing and incoming transmission, wherein the telephone line connecting the two stations is a conventional telephone line serving for conversation between two persons.

2. The device of claim 1, wherein the master station incorporates eight switches making it possible to give eight different instruction non-simultaneously, and eight pilot lights making possible the verification of instruction execution.

3. The device of claim 1, wherein the master station incorporates 16 switches making it possible to give 16 different instrucions non-simultaneously, and 24 pilot lights.

4. The device of claim 1, wherein the frequency generator (3, 17) generates all the frequencies used by dividing a single stabilized pilot frequency.

5. The device of claim 1, wherein a pilot frequency is equal to 1 MHz and is divided by 19 in a divider circuit (20) to obtain 52,631 Hz, the latter being divided first three time by 16 (22) to obtain a clock frequency of 12.8 Hz, secondly by 28 to obtain the logic level 1 of 1880 Hz, and thirdly by 29 to obtain the logic level 0 to 1815 Hz.

6. The device of claim 1, wherein, at the master station, a frequency of 12.8 Hz is divided twice by 5 (24) to obtain a time base of the complete cycle of 0.5 Hz, and wherein, at the end of each cycle, a circuit (26) supplies a pulse of 0.15 seconds serving for synchronizing the time bases of the two stations.

7. The device of claim 1, wherein coding of the message is arranged in such a way that there is a series 0 which is reserved for the control signal, a series 1 which is reserved for coding of the address, and a series 2 which is reserved for the return signal, the three series succeeding one another in time in order to use only a single telephone line for outgoing and incoming transmission.

8. The device of claim 1, wherein all circuits employed are arranged so as not to use any coil.

9. The device of claim 1, wherein the input interface (15) incorporates opto-coupler assemblies.

10. The device of claim 1, wherein the device incorporates an alarm system which would consist of an automatic call by the subordinate station to the master station to signal a change of state.

11. The device of claim 1, which further comprises identification by a simple coding which personalizes the device for the user.

12. The device of claim 11, wherein said identification consists of a set of miniature switches which are set open or closed once and for all at the time of installation.

13. The device of claim 1, wherein the control and returned signals are (11, 6) detected with frequency discrimination by the superposition of rectangular signals coming from tuned amplifiers, these signals coinciding only at the tuning frequency.

* * * * *